United States Patent
Dixon (10) Patent No.: US 10,483,894 B2
(45) Date of Patent: Nov. 19, 2019

(54) MOTOR CONTROL WITH VOLTAGE HARMONIC SHAPING

(75) Inventor: Christoper David Dixon, Finham (GB)

(73) Assignee: TRW LIMITED, Solihull West Midlands (GB)

( * ) Notice: Subject to any disclaimer, the term of this patent is extended or adjusted under 35 U.S.C. 154(b) by 0 days.

(21) Appl. No.: 14/123,622

(22) PCT Filed: May 16, 2012

(86) PCT No.: PCT/GB2012/051089
§ 371 (c)(1),
(2), (4) Date: Mar. 7, 2014

(87) PCT Pub. No.: WO2012/164250
PCT Pub. Date: Dec. 6, 2012

(65) Prior Publication Data
US 2014/0191699 A1    Jul. 10, 2014

(30) Foreign Application Priority Data

Jun. 3, 2011 (GB) .................................. 1109348.1

(51) Int. Cl.
G05B 5/01 (2006.01)
B62D 5/04 (2006.01)
H02P 23/14 (2006.01)

(52) U.S. Cl.
CPC .................................... *H02P 23/14* (2013.01)

(58) Field of Classification Search
CPC .................................. G05B 5/01; B62D 5/046
(Continued)

(56) References Cited

U.S. PATENT DOCUMENTS

| 4,459,534 A * | 7/1984 | Nagase ................ H02P 21/08 318/803 |
| 4,599,549 A * | 7/1986 | Mutoh .............. H02M 7/53875 318/798 |

(Continued)

FOREIGN PATENT DOCUMENTS

| EP | 2034605 A1 | 11/2009 | |
| GB | 1006404.6 | * 4/2010 | ............ H02P 6/002 |

(Continued)

OTHER PUBLICATIONS

Chinese Notification of the Second Office Action, Application No. 201280035042.8, dated Mar. 30, 2016.

(Continued)

*Primary Examiner* — Bickey Dhakal
*Assistant Examiner* — Cortez M Cook
(74) *Attorney, Agent, or Firm* — MacMillan, Sobanski & Todd, LLC (57) ABSTRACT

A control system for an electric motor (10) comprises a current sensing means (14) arranged to produce a current sensing output indicative of electric current in the motor, current control means (20) arranged to receive a current demand and to control voltages applied to the motor, and correction means (26) arranged to receive the current sensing output and the current demand, and use them to generate a correction signal. The current control means (20) is arranged to receive the correction signal and to use the correction signal to correct the voltages applied to the motor.

21 Claims, 5 Drawing Sheets

(58) Field of Classification Search
USPC ............................... 318/432, 701, 798, 809
See application file for complete search history.

(56) References Cited

U.S. PATENT DOCUMENTS

| | | | | |
|---|---|---|---|---|
| 5,694,017 | A * | 12/1997 | Lansberry | ............... H02P 21/06 |
| | | | | 180/65.8 |
| 5,699,240 | A | 12/1997 | Obayashi | |
| 2002/0097015 | A1 * | 7/2002 | Kitajima et al. | ............. 318/432 |
| 2003/0001536 | A1 | 1/2003 | Kitajima | |
| 2003/0090232 | A1 * | 5/2003 | Ho | ......................... H02P 21/22 |
| | | | | 318/801 |
| 2004/0201358 | A1 * | 10/2004 | Kawaji et al. | ................ 318/701 |
| 2007/0279948 | A1 | 12/2007 | Skin et al. | |
| 2009/0251096 | A1 | 10/2009 | Schulz et al. | |
| 2010/0109583 | A1 * | 5/2010 | Maekawa | ........... H02P 21/0003 |
| | | | | 318/400.02 |
| 2011/0043144 | A1 * | 2/2011 | Ueda | ...................... B62D 5/046 |
| | | | | 318/400.02 |
| 2013/0193898 | A1 * | 8/2013 | Williams | ................. G05B 5/01 |
| | | | | 318/504 |

FOREIGN PATENT DOCUMENTS

| | | |
|---|---|---|
| WO | 2011107773 A2 | 9/2011 |
| WO | 2012164250 A1 | 12/2012 |

OTHER PUBLICATIONS

International Search Report, Application No. PCT/GB2012/051089 dated Oct. 24, 2012.
Patents Act 1977: Search Report Under Section 17, Application No. GB1109348.1 dated Nov. 23, 2011.

* cited by examiner

MOTOR CONTROL WITH VOLTAGE HARMONIC SHAPING

FIELD OF THE INVENTION

The present invention relates to the control of electric motors, and in particular to the control of harmonics in the voltages applied to the windings of electric motors. It can be used, for example, to correct harmonic errors in the voltages output by motor drivers, and to add harmonics to the voltages input to the motor to correct harmonic variations in the torque output of the motor.

BACKGROUND TO THE INVENTION

Figure 1:
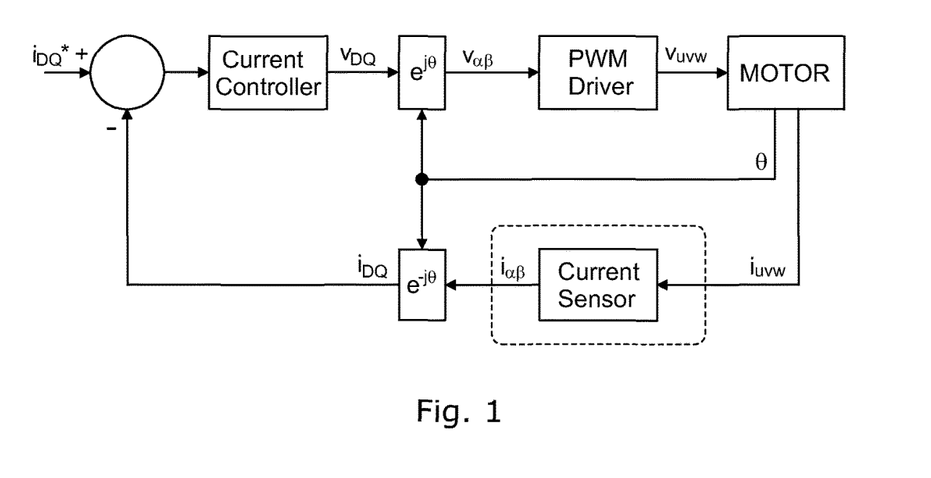
FIG. 1 is a diagram of a known closed loop current control system for a motor.

A closed loop current controller for an electric actuator typically takes the form shown in FIG. 1. Using vector control in response to a requested target current, a voltage is applied to each phase winding of the motor and the resultant generated currents measured. The measured currents are then used by a controller, typically a PI controller, to control to the requested voltage to achieve the target current. A signal which gives the electrical position of the motor is also required so that the voltages can be applied at the correct phases at the correct times. In the system of FIG. 1 a position sensor is shown but the present invention is equally applicable to a position sensorless system, where the position signal is estimated from other sensor measurements.

Figure 2:
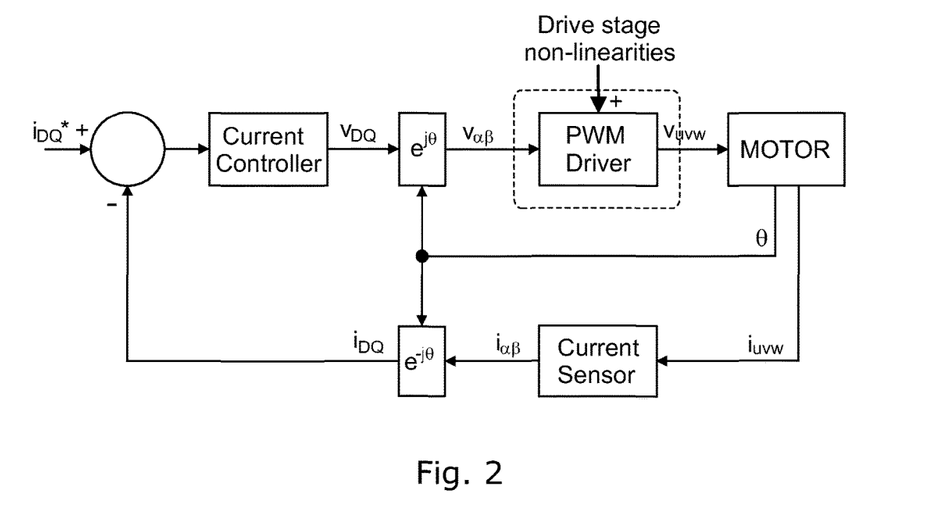
FIG. 2 is a diagram showing how harmonic errors generated in the motor driver affect the system of FIG. 1.

Typically for a 3 phase motor the driver comprises a 6 FET bridge arranged to apply a known voltage to the motor terminals in a PWM pattern to achieve the desired closed loop current. Due to the PWM switching patterns that are applied to the motor to produce the desired voltage, drive stage non-linearities in the form of additional unwanted harmonic frequencies can be introduced as shown in FIG. 2.

Our earlier application PCT/GB2011/050748 discloses a motor control system in which the level of distortion at the distortion frequency is measured and a correction signal input to the controller which can then correct the applied voltages to compensate for the distortion. To improve measurement of the distortion, the current component at the distortion frequency is isolated from the current component at the fundamental frequency, by applying a frequency shifting transformation to transform the distortion frequency to a DC component, and then filtering out the fundamental frequency component using a low pass filter. At high motor speeds the difference between fundamental and distortion frequencies is sufficient for this to be achieved effectively. However at low motor speeds the difference between the two frequencies is lower, and effective filtering becomes much more difficult.

SUMMARY OF THE INVENTION

The present invention therefore provides a control system for an electric motor, the system comprising a current sensing means arranged to produce a current sensing output which may be indicative of electric current in the motor. The system may further comprise current control means, which may be arranged to receive a current demand, and/or may be arranged to control voltages applied to the motor. The system may further comprise correction means, which may be arranged to receive the current sensing output and the current demand. The correction means may be arranged to generate a correction signal. The current control means may be arranged to receive the correction signal and to use the correction signal to correct the voltages applied to the motor.

The correction means may be arranged to identify a distortion frequency. The correction means may be arranged to determine, or measure, for example from the current sensing output and the current demand, a component of the current in the motor at the distortion frequency.

The correction signal may be arranged to indicate the magnitude of the distortion frequency component.

The correction means may be arranged to generate a distortion signal from the current sensing output and the current demand. It may be arranged to determine or measure the distortion frequency component from the distortion signal. For example the correction means may be arranged to perform a comparison between at least a component of the current sensing output and at least a component of the current demand thereby at least partially to isolate the distortion frequency component from a fundamental component of the current in the motor. The component, in either case, may be a fraction. For example the control means may be arranged to subtract a fraction of the current demand from the current sensing output. The fraction may be fixed, or may be variable. If it is variable it may be arranged to vary with, for example, motor speed.

The current control means may be arranged to output a voltage demand indicative of voltages to be applied to the motor. The correction signal may be arranged to indicate corrections to the voltage demand.

The correction means may be arranged to transform at least a part of the distortion signal so that the identified component becomes a DC component. It may be arranged to measure the magnitude of the DC component.

The correction means may be arranged to operate in a high speed mode and a low speed mode. It may be arranged to use the current demand to generate the correction signal in the low speed mode. In the high speed mode it may be arranged at least partially to isolate the distortion frequency component from the fundamental component by filtering. Alternatively, the correction means could use the current demand to generate the correction signal in both the high and the low speed modes.

The system may further comprise a filter arranged to filter out a range of frequencies to perform the filtering. The control system may be arranged to operate in the high speed mode when the fundamental frequency is within a range which will be filtered out by the filter. It may be arranged to operate in the low speed mode at lower speeds when the fundamental frequency is not within said range.

The correction means may be arranged to generate the correction signal so as to reduce the identified component, or it may be arranged to increase the identified component. The reduction or increase may be by a variable amount so as to correct for measured distortion, or it may be by a fixed amount, for example to correct for a known distortion of the system. For example it may be arranged to generate the correction signal at a fixed magnitude so as to correct a torque harmonic of the motor.

The correction means may be arranged to combine the correction signal with the voltage demand to produce the corrected voltage demand.

The motor may have stationary windings and a rotor which rotates relative to the windings. The current sensing means may comprise a current sensor arranged to measure current in the motor windings, and may comprise transformation means arranged to transform the measured current into the frame of reference of the rotor. The current sensing output may define the current in a frame of reference which is rotating, for example the rotor frame of reference having D and Q components, or in a frame of reference that is fixed, having α and β components.

The current control means may be arranged to output the voltage demand so as to define a demanded voltage in a frame of reference which is rotating, for example the rotor frame of reference having D and Q components, or in a frame of reference that is fixed, having α and β components.

The system may be arranged to correct a plurality of components of distortion. The components of distortion may be harmonics having different frequencies and/or different signs.

Preferred embodiments of the present invention will now be described by way of example only with reference to the accompanying drawings.

DESCRIPTION OF THE PREFERRED EMBODIMENTS

Figure 3:
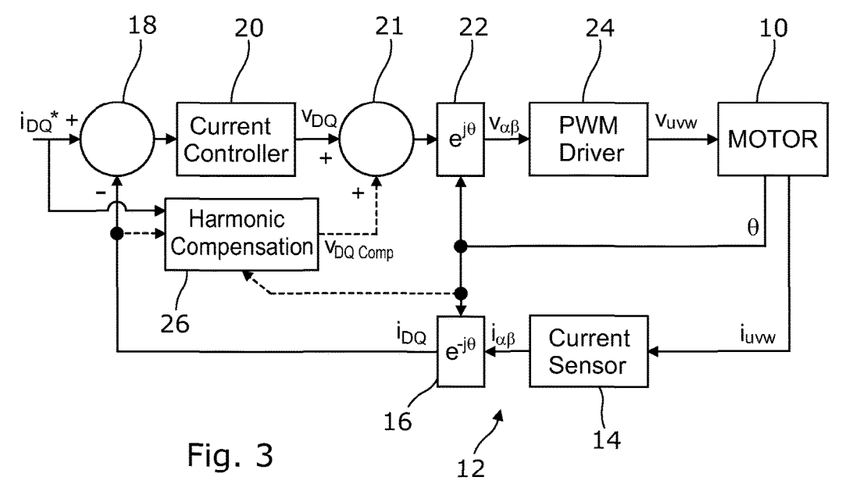
FIG. 3 is a diagram of a closed loop current control system for a motor according to an embodiment of the invention.

Referring to FIG. 3 a motor 10 is controlled by a closed loop motor current control system according to an embodiment of the invention, which comprises a current sensing system 12 and a current controller 20. The current sensing system 12 comprises a current sensor 14 arranged to measure the currents $i_U$, $i_V$, $i_W$, in the three phases of the motor, which comprise stationary windings, and output a signal indicative of the current vector in the stationary coordinates having α and β components. The current sensing system further comprises a coordinate transformation block 16 arranged to convert the current vector from the α and β components in the stationary reference frame, to D and Q components $i_D$ and $i_Q$ defining the current vector in the rotor reference frame, which rotates relative to the fixed windings, with the Q axis current being the torque generating component and the D axis current being non-torque generating. A comparator 18 receives the measured D and Q currents from the current sensing system 12 and compares them with demanded D and Q current components to generate a current error. The current controller 20 receives the current error and outputs a demanded voltage vector, in the form of a D and Q axis voltage demand $V_{DQ}$ calculated to reduce the current error so that the measured current vector $I_{DQ}$ approaches the demanded current vector $i_{DQ}*$. A further transformation block 22 receives the voltage demand from the current controller and converts it to α and β components $V_{\alpha\beta}$ which are input to a PWM driver 24 which comprises a 6 FET bridge and is arranged to control the FET switches to apply voltages to the phase windings of the motor in a PWM pattern which produces the net voltage in the windings having a magnitude and direction corresponding to the voltage demand vector.

The motor driver 24 in this system produces harmonic interferences as described above. The harmonic errors are not observable in the voltage demand output by the current controller 20. However, it will be observable on the current sensor signal output from the current sensing system 12.

The control system therefore further comprises a harmonic compensation controller 26 arranged to provide a harmonic compensation function. To achieve this the harmonic compensation controller 26 is arranged to monitor the measured currents, in this case by monitoring $I_{DQ}$, thereby to measure the harmonic interference, and apply a correction, using an adder 21, to the voltage demand output by the current controller 20 such that the harmonic error is removed. In a high speed mode, the harmonic compensation controller 26 measures the harmonic interference solely from the measured currents. However it also receives and monitors the current demand $i_{DQ*}$ and, when operating in a low speed mode, it is arranged to use this input as well as the measured currents to measure the harmonic interference. The harmonic compensation controller 26 is also arranged to receive a motor position input signal θ to enable it to detect the position of the motor.

Figure 4:
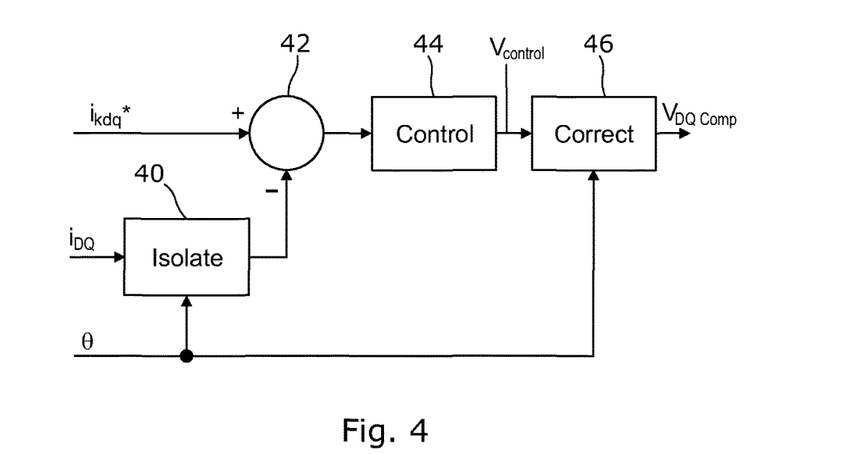
FIG. 4 is a diagram of the harmonic compensation system forming part of the system of FIG. 4.

Referring to FIG. 4 the harmonic compensation process can be broken down into three steps which are shown as functional blocks of the harmonic compensation controller 26:

1. Isolation—an isolation block 40 is arranged to monitor the measured currents in the motor and isolate the unwanted frequencies.
2. Control—a control block 44 is arranged to use a closed loop current control system to generate a control (cancellation) signal indicative of the level of harmonic correction required such that the unwanted harmonics are reduced to zero, or such that other harmonics are injected at a required level, as defined by an isolation frequency demand signal $i_{kDQ}*$.
3. Correct—a correction block 46 is arranged to apply a correction to the voltages applied to the motor, based on the control (cancellation) signal.

Isolation

Although a number of techniques may be used to isolate the unwanted harmonics, such as a runtime Fast Fourier Transform (FFT) or notch filter, the approach used in this embodiment is to use a synchronous filter that is arranged to transform the measured current to the isolation frequency reference frame. This allows the unwanted harmonic, which is in this case assumed to be a single harmonic of known frequency, to be isolated simply.

Figure 5:
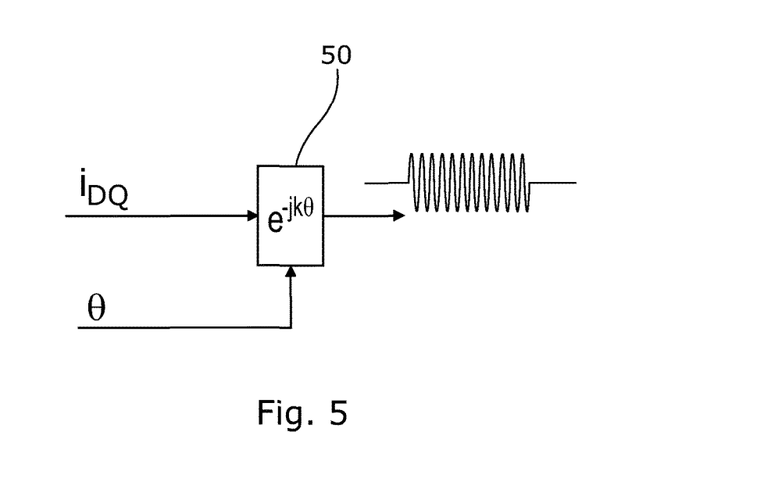
FIG. 5 is a diagram of a synchronous filter forming part of the system of FIG. 3.

FIG. 5 shows one implementation of a synchronous filter 50, which receives as inputs the current sensor output $I_{DQ}$, the motor electrical position θ and the harmonic k (relative to the motor electrical frequency) to be isolated. It also receives as an input the demanded current $i_{DQ}*$ but that is only used in the low speed mode. Note that k can be positive or negative depending on whether the targeted harmonic is a positive or negative sequence component (i.e. whether it travels in the same direction as the rotor or the opposite direction).

The transformation $e^{jk\theta}$ performed by the filter 50 is defined as:

$$y(t) = e^{jk\theta}u(t) = \begin{bmatrix} \cos(k\theta) & \sin(k\theta) \\ -\sin(k\theta) & \cos(k\theta) \end{bmatrix} u(t)$$

where u(t) is the input to the filter 40, which in the high speed mode is the measured current $I_{DQ}$, y(t) is the output, and θ is the electrical position of the motor.

Figure 6:
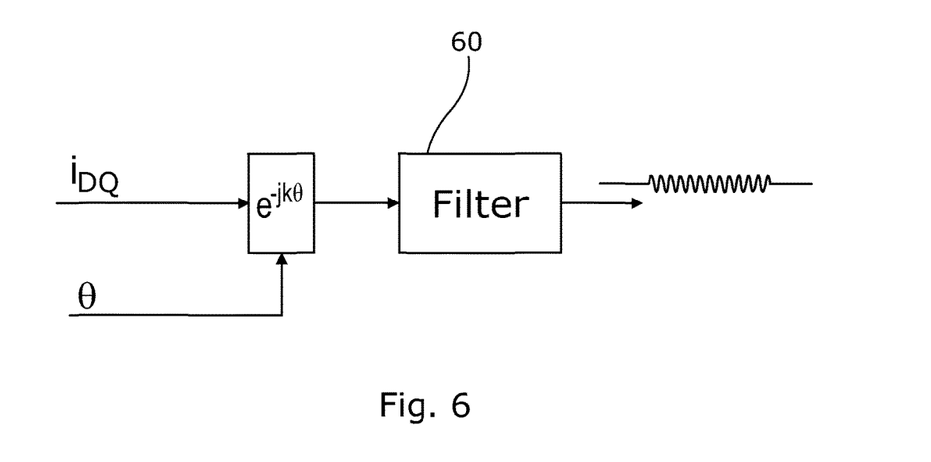
FIG. 6 is a diagram of a filter arrangement similar to that of FIG. 5 but with a further filter component.

The transformed signal output by the synchronous filter 50 will contain DC and AC components. The DC component is the quadrature component of the target harmonic. The AC components are caused by all of the other harmonics in the original signal. If the two components (D and Q) of the signal are zero the DC component will be zero and the isolation frequency can be considered not to be present in the current controller output voltages. As shown in FIG. 6, if necessary a filter 60 may be added to the control path at the output of the synchronous filter 50 to help to attenuate the unwanted AC components so that the DC component can be more easily isolated.

Control

As previously shown in FIGS. 5 and 6, the synchronous filter produces a signal where the DC component is the magnitude of the isolated harmonic k. If the DC component is zero then the harmonic is not present.

The aim of the control function of the harmonic compensation unit 26 is therefore to generate a signal(s) which is indicative of the level of harmonic compensation required to reduce the DC component to zero. It therefore receives the output from a comparator which compares the output from the synchronous filter with an isolation frequency demand signal $i_{kdq}^*$. The isolation frequency demand signal can be set to zero if the isolated frequency is to be removed. The control block is then arranged to generate a control signal $V_{control}$ which indicates the degree of correction of the voltage demand signal that is required. A number of controllers may be used but the preferred solution is a controller of the standard PID form. To remove the inverter non-linearity the current demands in the harmonic frame, $i_{kdq}^*$ are set to zero for removal of just inverter non-linearity. As will be described below, non-zero values of the isolation frequency demand signal can also be used.

For systems with limited voltages available the decision must be made as to which controller has priority, i.e. whether the current controller 20 or the harmonic compensation controller 26 has priority. One solution used in this embodiment is to allow the harmonic compensation to operate without limit and reduce, where applicable, the standard current controller operating limit. This is implementation specific and other embodiments can be configured to give priority to the current controller (and limit the harmonic compensation control action). Another solution is to allow the harmonic controller a fixed percentage of the limit. It can operate up to this limit. The current controller then has what is left—either the limit less the fixed percentage or the limit less what the compensation actually uses (to maximise the current controller voltage)

Correction

Figure 7:
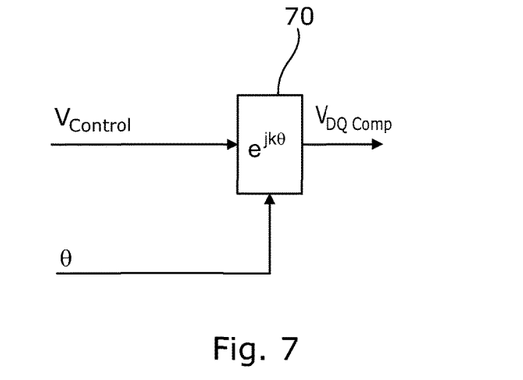
FIG. 7 is a diagram of a correction part of the system of FIG. 3.

Once the control action has been calculated the corrective action must be applied to the demanded voltages. There are many ways to achieve this, such as the use of an inverse FFT but the preferred solution is shown in FIG. 7, and comprises a transformation block 70. The control signal $V_{control}$ is a DC signal indicative of the magnitude of the unwanted harmonic, and is input to the transformation block 70 which is arranged to transform it back to the dq reference frame to produce a compensation voltage $V_{DQcomp}$, which will be an AC signal at the unwanted harmonic frequency. The adder 21 of FIG. 3 is arranged to add the compensation voltage to the standard current control voltage demands $V_{DQ}$ applied to the motor.

Whereas in the system of FIG. 3 the D and Q axis current sensing signal is monitored and the D and Q axis voltage demand corrected, it is equally possible for the correction to be carried out in the fixed reference frame with the α and β components of the current sensor output being monitored and the voltage demand being corrected after it has been transformed to α and β components.

Active Harmonic Shaping

Although the compensation scheme described above can be used to remove a harmonic from the voltages applied to the motor, the opposite case can also occur. The system of FIG. 3 provides the ability to inject a harmonic of a particular phase and magnitude into the voltages applied to the motor. Referring back to FIG. 4, the current demands in the harmonic frame, $i_{kdq}^*$ instead of being set to zero can be set to produce the correct magnitude and phase for the harmonic to be applied. The harmonic correction block 26 uses the motor position signal θ to generate the correction signal in the D,Q axis reference frame at the correct frequency and phase.

One application for this is to remove a torque harmonic, i.e. a variation in the torque output of the motor at a harmonic of the motor speed, that is inherent in the design of a particular motor. For example, for a 9 slot 6 pole motor there can exist (amongst others) an 18$^{th}$ order torque harmonic which is present due to the motor design. If the phase and magnitude of the motor torque harmonic is known then the algorithm can actively cancel out the motor harmonic by applying the same signal in anti-phase (in addition to cancelling out the inverter non-linearity). It is likely that these parameters will vary with motor speed and load and as such this would need to be accounted for.

Low Speed Operation

Figure 8:
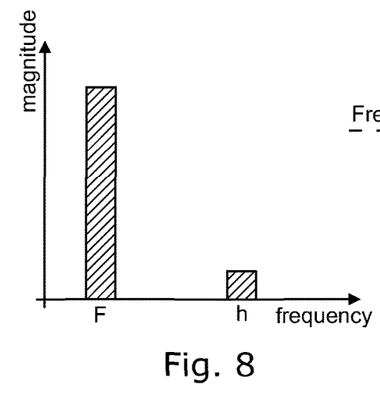
FIG. 8 is a plot showing the fundamental and distortion frequency current components in the measured current.
Figure 9:
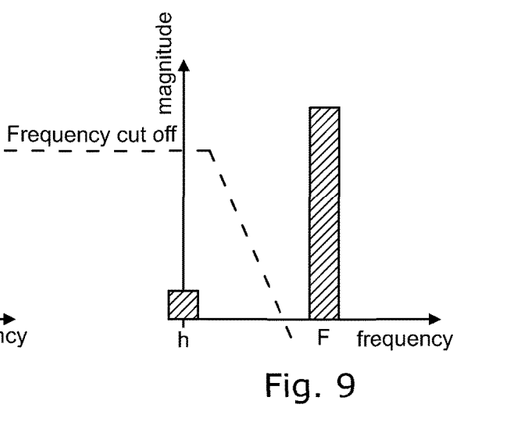
FIG. 9 is a plot showing the components of FIG. 8 after transformation of the distortion component.

Referring to FIG. 8, the magnitude of the fundamental frequency component of the measured current F is typically much greater than the unwanted harmonic component h. The transformation performed on the current sensor output is done using a low bandwidth controller so that, while the frequency of the target component is shifted to transform it to a DC component, the frequencies of the fundamental and other components are not affected. Therefore the frequency components after transformation are as shown in FIG. 9. FIG. 9 also shows the frequency cut-off response of the filter used to isolate the DC component. As shown in FIG. 9, the fundamental frequency is at a frequency that will not be passed by the filter. This is because the motor is operating at relatively high speed so the separation between the frequencies is large. As the motor speed decreases, the frequency of the harmonics in the signal decreases. A point is reached where the controller (filter and control) cannot reject the fundamental and/or other frequency components to effectively isolate the distortion harmonic. For example, at 100 rpm the fundamental is at 100 Hz and the second harmonic is at 200 Hz. The separation is therefore 100 Hz (200 Hz-100 Hz) but decreasing the speed to 10 rpm, where the fundamental is at 10 Hz and the second harmonic is at 20 Hz, the separation reduces to 10 Hz.

As the speed decreases using the high speed mode described above, a point is reached where the harmonic compensation algorithm is affecting other frequencies, particularly the fundamental, and the performance of the overall system is degraded.

One option is to use higher order filtering which has a sharper roll off frequency. While feasible this is time consuming computationally and depending on the execution frequency of the algorithm may not be possible. Even if it is possible, there will still be a minimum speed at which separation cannot be achieved.

Figures 10, 11:
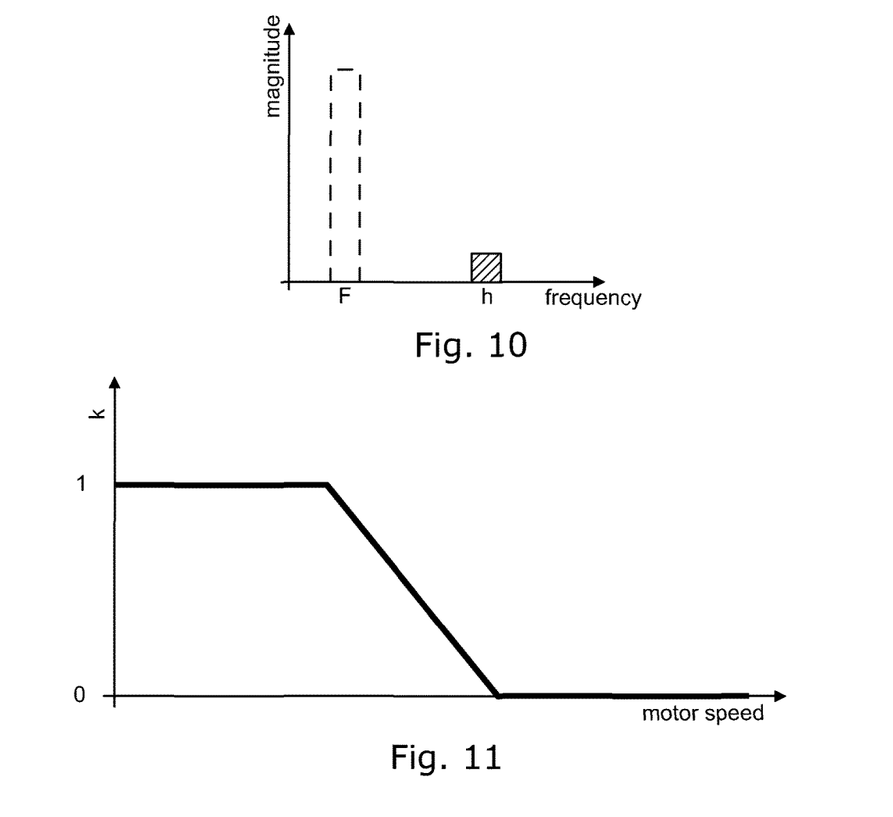
FIG. 10 is a plot showing removal of the fundamental component when the system is operating in a low speed mode.
FIG. 11 is a plot showing a gradual introduction of the low speed mode with reducing motor speed.

The system in this embodiment is therefore arranged to operate in a different mode at lower motor speeds. In this low speed mode, referring back to FIG. 4, the $i_{DQ}$ input to the isolation block 40 is modified to a low speed input which is a 'distortion signal' indicative of the difference between the measured current and the demanded current. In this case it is a simple subtraction $I_{DQ}-i_{DQ}*$. Because at low motor speeds, the current controller can be assumed to have sufficient bandwidth to control the current very closely to the demanded current, it can be assumed that, apart from distortions, the measured current is equal to the demanded current. Specifically the demanded current is essentially equal to the fundamental component of the measured current. Therefore the difference between the two, $I_{DQ}-i_{DQ}*$, will be a measure of distortion, and will therefore effectively isolate the unwanted harmonic(s) in the measured current. The frequency components of this distortion signal forming the modified input to the isolation block are shown in FIG. 10, in which the fundamental frequency component is seen as removed. This modified input is then treated by the isolation block exactly as the measured current input is treated in the high speed mode.

Of course, in an alternative arrangement the low speed mode could be used at all motor speeds, so that the High speed mode described above could be omitted if desired.

Scheduling of the High Speed and Low Speed Modes

As indicated above, the different limitations of the high speed mode and the low speed mode mean that they work well at high and low speeds respectively, and there are various options for scheduling their use at different motor speeds. In one embodiment the harmonic compensation block 26 is arranged to monitor the motor speed (electrical or mechanical) and compare it to a threshold speed, and if the motor speed is above the threshold to use the high speed mode, and if it is below the threshold speed, to use the low speed mode. A degree of hysteresis can be incorporated to avoid cycling between modes at the threshold speed.

In another embodiment, the harmonic compensation block is arranged to generate an input to the isolation block of the form $I_{DQ}-G\,i_{DQ}*$ i.e. (measured current−(G×demanded current)). The variable k can be fixed or variable. For example it can be made to vary with motor speed. Referring to FIG. 11, in one embodiment G is 1 for motor speeds below a first threshold speed, and 0 for speeds above a second threshold speed, which is higher than the first, and decreases with increasing motor speed from 1 to 0 between the first and second threshold speeds. This provides a gradual transition from the high speed mode to the low speed mode.

It will be appreciated that the low speed mode has a number of advantages. The filtering requirements of the system can be reduced by removing the fundamental component before transformation to the harmonic reference frame, potentially reducing the computational complexity. As a result the harmonic can be actively controlled over a much wider speed range, which provides improved NVH performance. The transient behaviour of the algorithm is improved at low speeds. The impact on the overall control is improved as the isolation of the harmonic is improved.

Compensating More than One Harmonic Simultaneously

Depending on the motor and inverter designs, it is common for harmonics to be present at several harmonic frequencies. This algorithm can cancel several frequencies simultaneously by combining multiple harmonic compensation algorithms in parallel. This is because the controllers operate completely independently at different frequencies.

Figure 12:
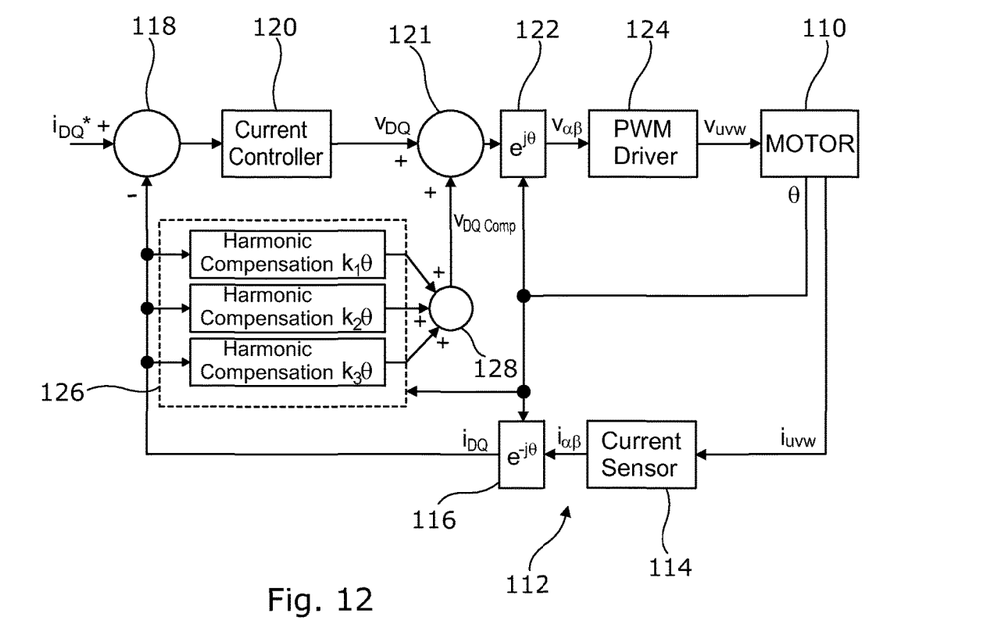
FIG. 12 is a diagram of a control system according to a further embodiment of the invention.

Referring to FIG. 12 a motor control system according to a further embodiment of the invention comprises the same features as that of FIG. 3, with like parts indicated by the same reference numerals increased by 100. In this case the harmonic compensation controller 126 is arranged to correct, or inject, a number of different harmonics $k_1$, $k_2$, $k_3$ using respective harmonic compensation control algorithms. Each of the algorithms is arranged to generate a respective voltage correction signal as described above, and the correction signals are combined by an adder 128 to produce a combined correction signal which is combined with the voltage demand output from the current controller 120. Each of the harmonics can be to correct distortion in the motor drive signals or to correct harmonic torque errors inherent in the motor as described above, or to correct other harmonic errors or distortions.

It will be appreciated that the number and order and sign of the harmonics that the compensation sub-algorithms are arranged to correct will depend on the nature of the current sensing system and the harmonic distortions that it produces. For example in some cases there may be two sub-algorithms arranged to correct two harmonics. These can be of the same order and different signs, of different order and the same sign, or of different order and different sign. In some cases there may be three sub-algorithms as shown in FIG. 12. In this case the three harmonics can be made up of two of the same order and opposite sign and one of a different order (and either sign), or three different orders, and all positive, all negative, two negative and one positive, or two positive and one negative.

The invention claimed is:

1. A control system for an electric motor comprising:
   a current sensing means arranged to produce a current sensing output indicative of electric current in an electric motor;
   a current controller arranged to receive a current demand and to control voltages applied to the electric motor; and
   a harmonic compensation controller arranged to operate in both (1) a high speed mode of operation of the motor, wherein the harmonic compensation controller identifies a distortion frequency and at least partially isolates a distortion frequency component from a fundamental frequency component of the current sensing output by filtering, and (2) a low speed mode of operation of the motor, wherein the harmonic compensation controller receives the current sensing output and the current demand as separate inputs and uses the separate current sensing output and the current demand inputs to generate a correction signal,
   wherein the current controller is arranged to receive and use the correction signal to correct voltages applied to the electric motor.

2. The control system according to claim 1 wherein the harmonic compensation controller is arranged to determine, from the current sensing output and the current demand, a component of the current in the electric motor at the distortion frequency.

3. The control system according to claim 2 wherein the correction signal is arranged to indicate a magnitude of the distortion frequency component.

4. The control system according to claim 2 wherein the harmonic compensation controller is arranged to transform the current sensing output or the distortion signal so that the identified component becomes a DC component and to measure the magnitude of the DC component.

5. The control system according to claim 1 wherein the harmonic compensation controller is arranged to generate a distortion signal from the current sensing output and the current demand.

6. The control system according to claim 1 wherein the harmonic compensation controller is arranged to perform a comparison between at least a component of the current sensing output and at least a component of the current demand to at least partially isolate the distortion frequency component from the fundamental frequency component of the current in the electric motor.

7. The control system according to claim 1 wherein the current controller is arranged to output a voltage demand indicative of voltages to be applied to the electric motor, and wherein the correction signal is arranged to indicate corrections to the voltage demand.

8. The control system according to claim 7 wherein the harmonic compensation controller is arranged to combine the correction signal with the voltage demand to produce a corrected voltage demand.

9. The control system according to claim 7 wherein the current controller is arranged to output the voltage demand so as to define a demanded voltage in a frame of reference which is rotating.

10. The control system according to claim 1 further comprising a filter arranged to filter out a range of frequencies to perform the filtering, wherein the control system is arranged to operate in the high speed mode when the fundamental frequency is within a range which will be filtered out by the filter and to operate in the low speed mode at lower speeds when the fundamental frequency is not within the range.

11. The control system according to claim 1 for an electric motor having stationary windings and a rotor which rotates relative to the windings, wherein the current sensing means includes a current sensor arranged to measure current in the motor windings and a transformation means arranged to transform the measured current into the frame of reference of the rotor.

12. The control system according to claim 1 that is arranged to correct a plurality of components of distortion.

13. The control system according to claim 12 wherein the components of distortion are harmonics having different frequencies and/or different signs.

14. A combined control system and electric motor assembly comprising:
an electric motor; and
a control system including: (1) a current sensor that produces a current sensing output signal that is indicative of an electric current in the electric motor; (2) a current controller that receives a current demand signal and controls voltages applied to the electric motor; and (3) a correction circuit that operates in both (a) a high speed mode of operation of the electric motor, wherein the correction circuit identifies a distortion frequency and at least partially isolates a distortion frequency component from a fundamental frequency component of the current sensing output signal by filtering, and (b) a low speed mode of operation of the electric motor, wherein the correction circuit receives the current sensing output signal and the current demand signal as separate inputs and uses the separate current sensing output and the current demand inputs to generate a correction signal to the current controller, which uses the correction signal to correct voltages applied to the electric motor.

15. The combined control system and electric motor assembly according to claim 14 wherein the correction circuit determines, from the current sensing output signal and the current demand signal, a component of the current in the electric motor at the distortion frequency.

16. The combined control system and electric motor assembly according to claim 14 wherein the correction circuit generates a distortion signal from the current sensing output signal and the current demand signal.

17. The combined control system and electric motor assembly according to claim 14 wherein the correction circuit performs a comparison between at least a component of the current sensing output signal and at least a component of the current demand signal to at least partially isolate the distortion frequency component from the fundamental frequency component of the current in the electric motor.

18. The combined control system and electric motor assembly according to claim 14 wherein the current controller outputs a voltage demand signal that is indicative of voltages to be applied to the electric motor, and wherein the correction signal is indicates corrections to the voltage demand signal.

19. A control system for an electric motor comprising:
a current sensing means arranged to produce a current sensing output indicative of electric current in an electric motor;
a current controller arranged to receive a current demand and to control voltages applied to the electric motor; and
a harmonic compensation controller arranged to operate in both (1) a high speed mode of operation of the motor, wherein the harmonic compensation controller identifies a distortion frequency and at least partially isolates a distortion frequency component from a fundamental frequency component of the current sensing output by filtering, and (2) a low speed mode of operation of the motor, wherein the harmonic compensation controller receives the current sensing output and the current demand as separate inputs and uses the separate current sensing output and the current demand inputs to generate a correction signal,
wherein the current controller is arranged to receive and use the correction signal to correct voltages applied to the electric motor.

20. The control system according to claim 19 wherein the harmonic compensation controller is arranged to determine, from the current sensing output and the current demand, a component of the current in the electric motor at the distortion frequency.

21. The control system according to claim 20 wherein the correction signal is arranged to indicate a magnitude of the distortion frequency component.

* * * * *